(12) United States Patent
Vamvas

(10) Patent No.: US 8,723,350 B2
(45) Date of Patent: May 13, 2014

(54) OCEAN WAVE ENERGY CONVERTER AND METHOD OF POWER GENERATION

(75) Inventor: Vassilios Vamvas, Chester Springs, PA (US)

(73) Assignee: Vassilios Vamvas, Lexington, MA (US)

( * ) Notice: Subject to any disclaimer, the term of this patent is extended or adjusted under 35 U.S.C. 154(b) by 367 days.

(21) Appl. No.: 13/284,865

(22) Filed: Oct. 28, 2011

(65) Prior Publication Data

US 2012/0104761 A1 May 3, 2012

Related U.S. Application Data

(60) Provisional application No. 61/408,011, filed on Oct. 29, 2010, provisional application No. 61/414,246, filed on Nov. 16, 2010.

(51) Int. Cl.
F03B 13/10 (2006.01)
F03B 13/12 (2006.01)
H02P 9/04 (2006.01)
F03B 13/16 (2006.01)
F03B 13/18 (2006.01)
F03B 13/00 (2006.01)

(52) U.S. Cl.
CPC ............. *F03B 13/12* (2013.01); *F03B 13/16* (2013.01); *F03B 13/18* (2013.01); *F03B 13/10* (2013.01); *H02P 9/04* (2013.01); *F03B 13/00* (2013.01); *Y02E 10/38* (2013.01)
USPC ........................................................... 290/53

(58) Field of Classification Search
CPC .......... F03B 13/10; F03B 13/12; F03B 13/00; F03B 13/16; F03B 13/18; H02P 9/04; Y02E 13/38
USPC .......................................... 290/53, 54, 43, 42
See application file for complete search history.

(56) References Cited

U.S. PATENT DOCUMENTS

| 4,931,662 | A  | * | 6/1990  | Burton | 290/42  |
| 7,012,340 | B2 | * | 3/2006  | Yi     | 290/42  |
| 7,352,073 | B2 | * | 4/2008  | Ames   | 290/42  |
| 7,444,810 | B2 | * | 11/2008 | Olson  | 60/495  |
| 7,468,563 | B2 | * | 12/2008 | Torch  | 290/42  |
| 2012/0119624 | A1 | * | 5/2012 | Vamvas | 310/339 |
| 2013/0113211 | A1 | * | 5/2013 | Rohrer | 290/42  |

* cited by examiner

*Primary Examiner* — Javaid Nasri

(57) ABSTRACT

A device comprising a float (5) and a pivoting assembly of a rigid beam (10) and an elastic beam (30), firmly connected to each other, pivoting about a stationary point (15). The device transforms the rise and falls of the ocean waves into usable mechanical energy. In one embodiment, the elastic beam is latched into a latch mechanism (150). The latch mechanism obstructs the elastic beam to continue moving. The elastic beam deflects and accumulates potential power. When the elastic beam is released, it moves with a high speed and momentum. In another embodiment this momentum is utilized to counter-rotate an electric generator's two rotors (251, 252).

A method of transforming the energy of a mass in reciprocating motion to electrical power.

7 Claims, 17 Drawing Sheets

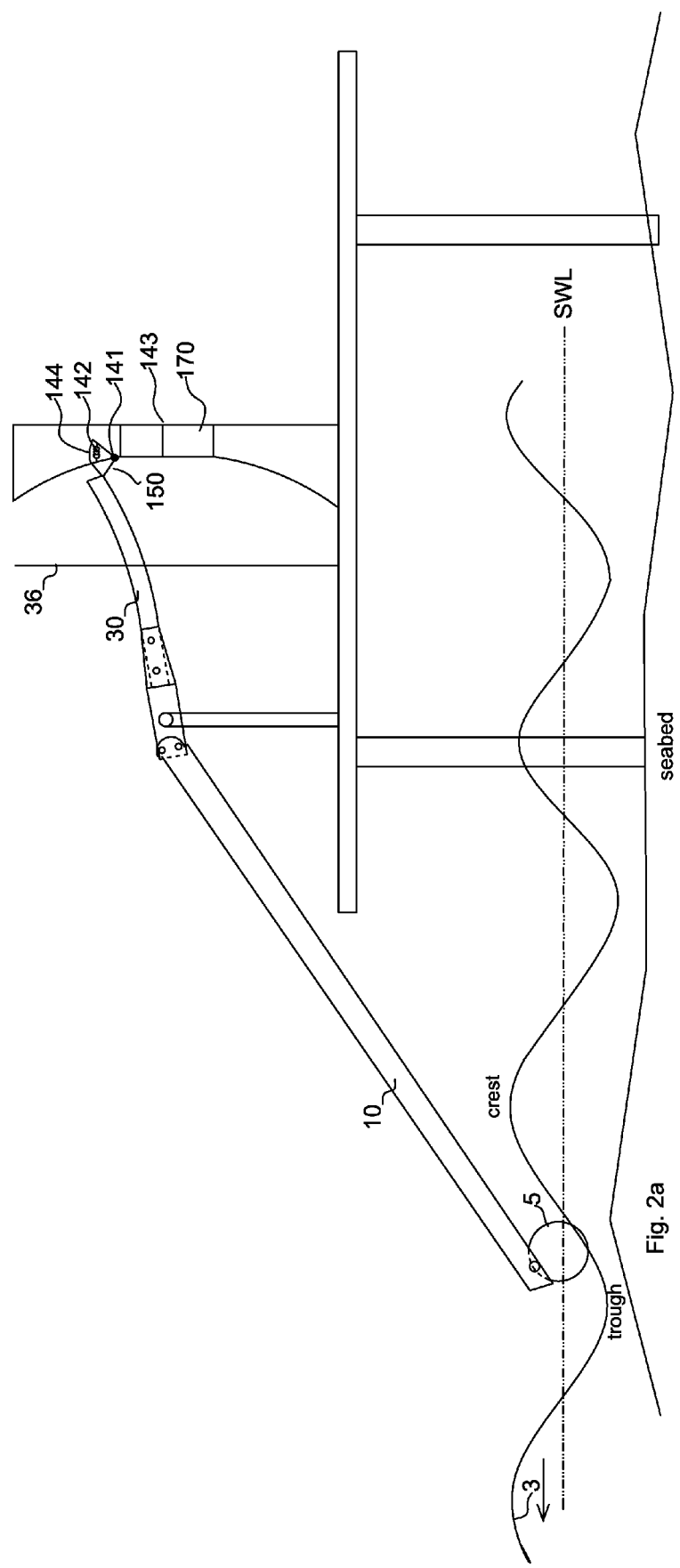

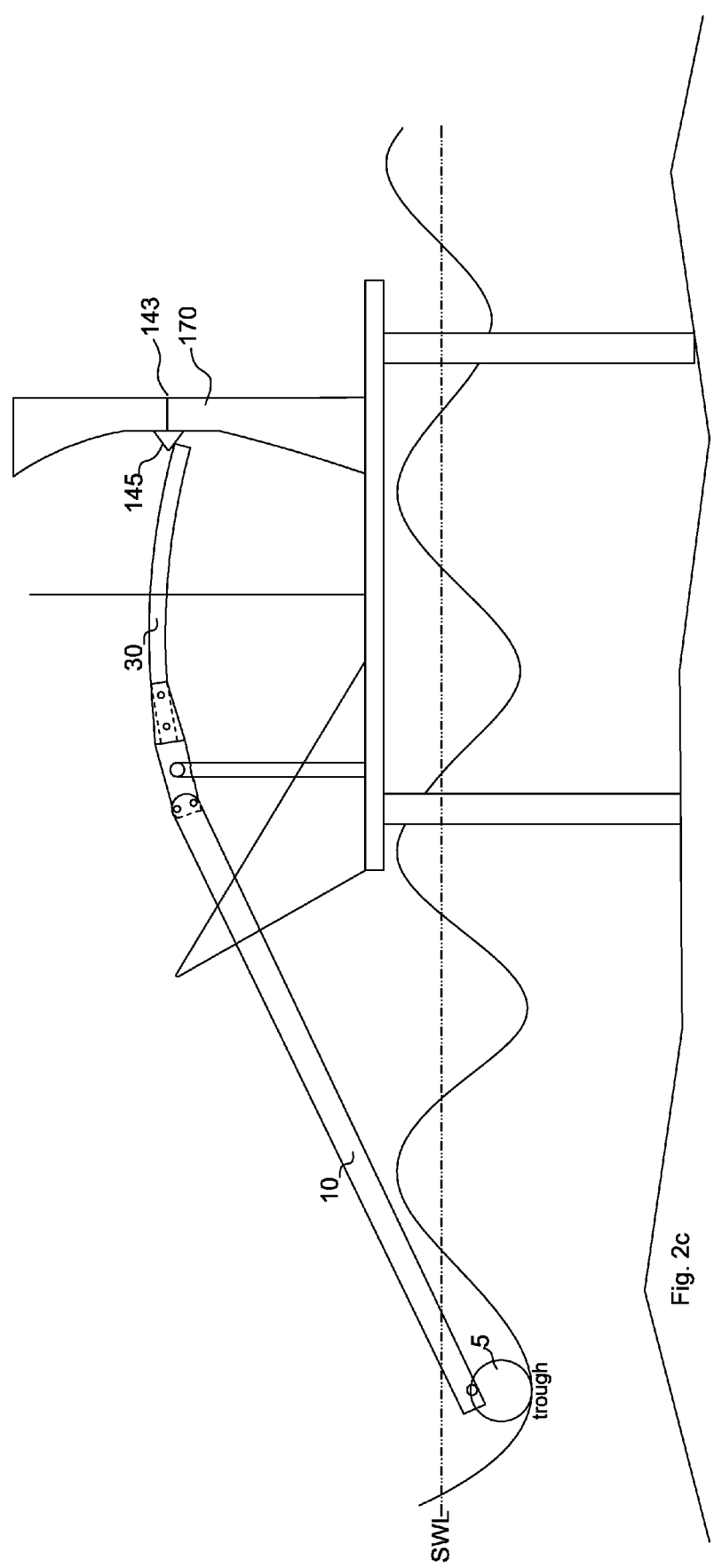

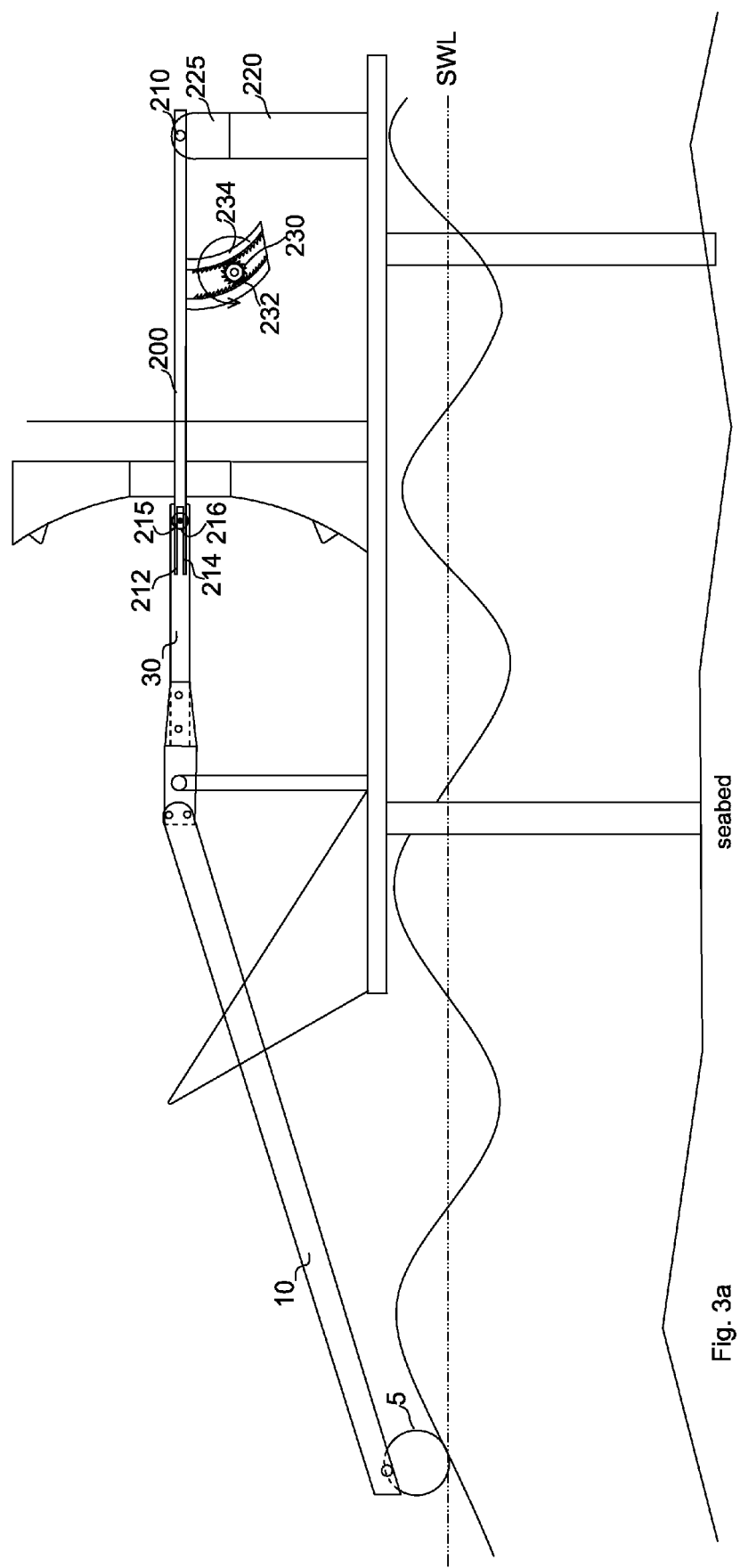

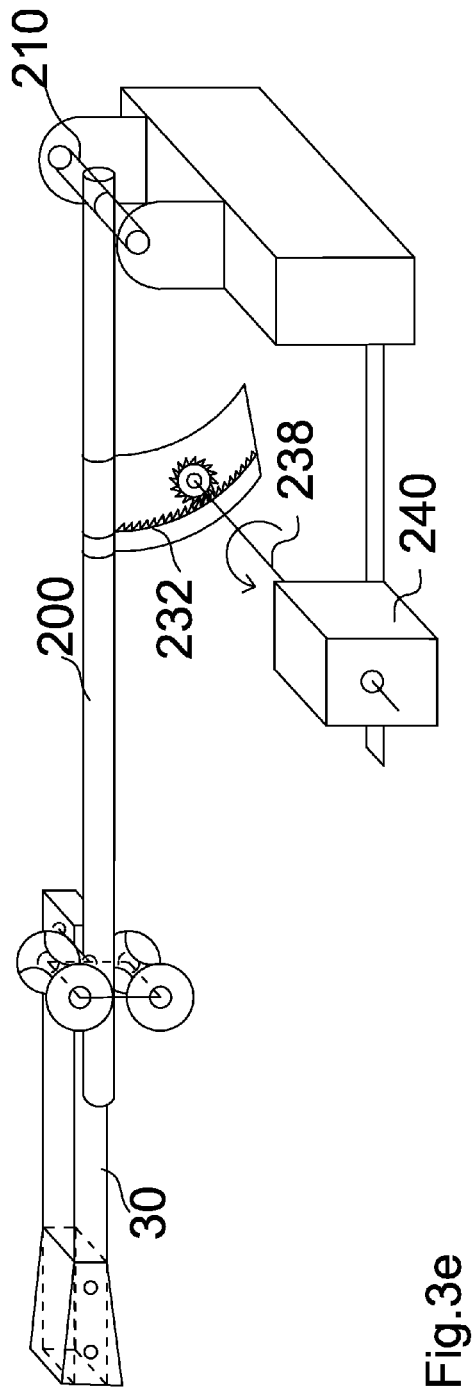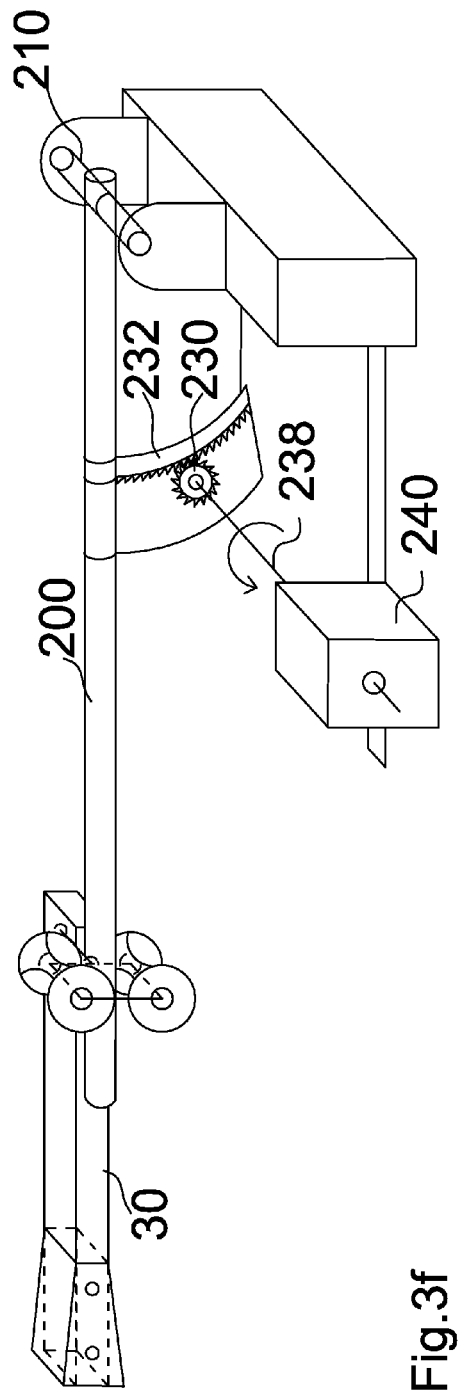

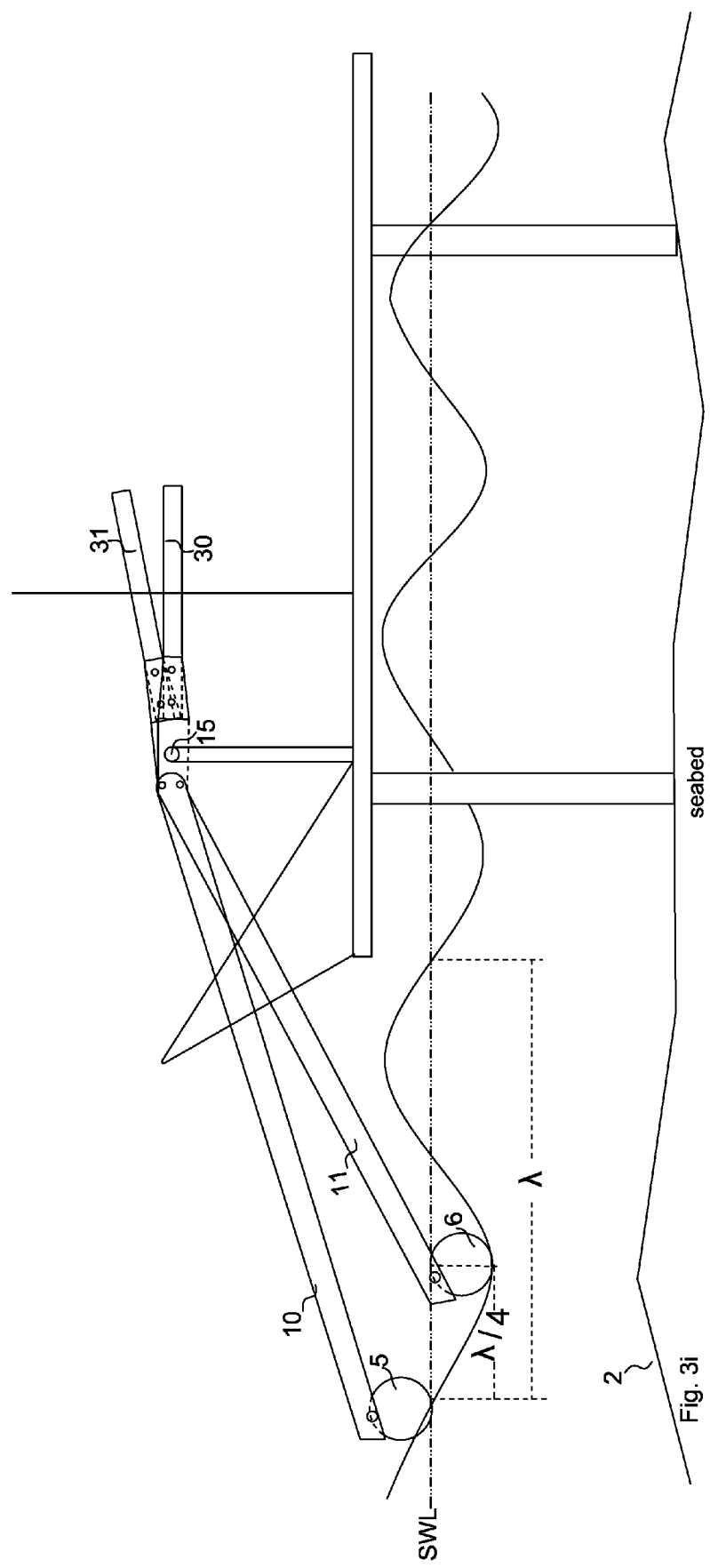

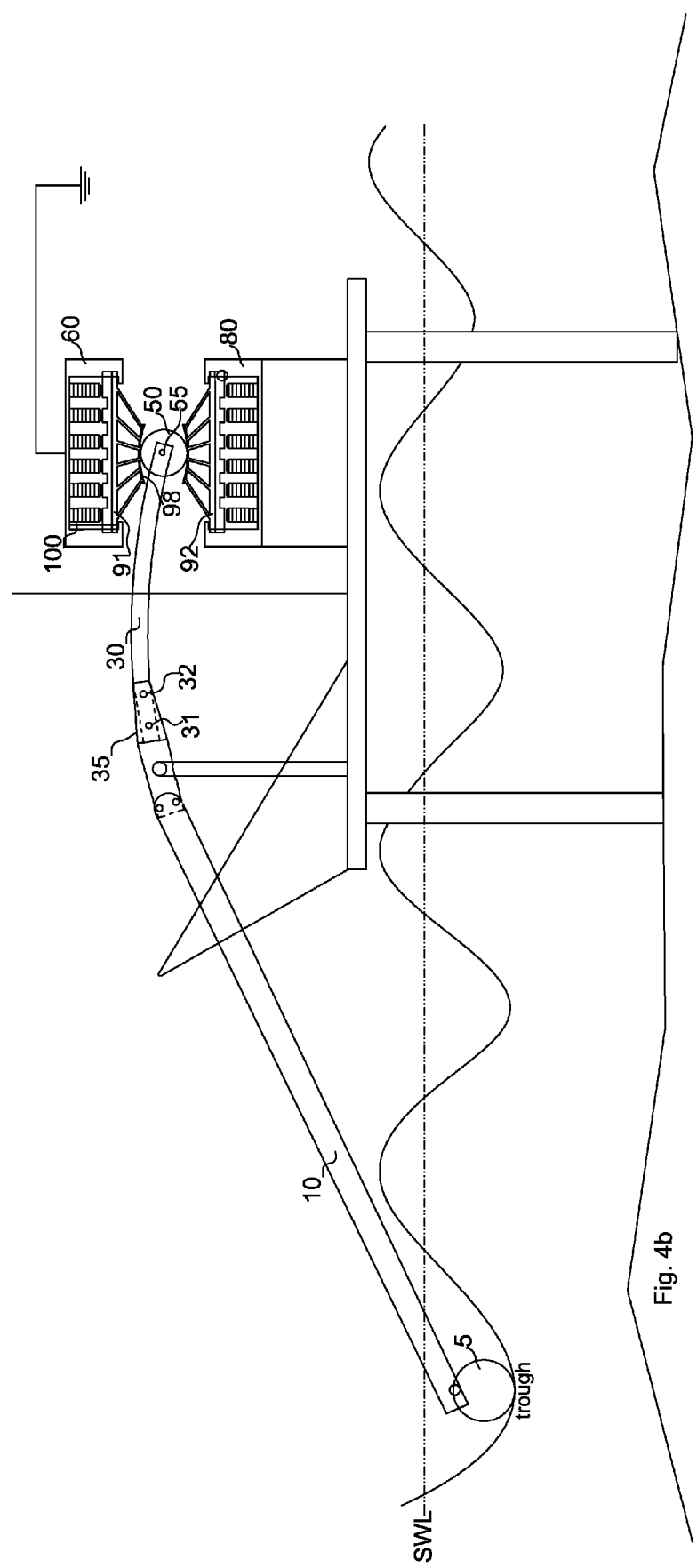

OCEAN WAVE ENERGY CONVERTER AND METHOD OF POWER GENERATION

CROSS-REFERENCE TO RELATED APPLICATIONS

This application claims the benefit of U.S. provisional patent application Ser. No. 61/408,011, filed 2010 Oct. 29 by the present inventor. The application also claims the benefit of U.S. provisional patent application Ser. No. 61/414,246, filed 2010 Nov. 16 by the present inventor.

BACKGROUND OF THE INVENTION

The following is a tabulation of some prior art that presently appears relevant:

U.S. PATENTS

| Pat. No. | Kind Code | Issue Date | Patentee |
|---|---|---|---|
| 7,468,563 | B2 | 2008-12-23 | Torch |
| 7,444,810 | B2 | 2008-11--4 | Olson |
| 7,352,073 | B2 | 2008-04--1 | Ames |
| 7,012,340 | B2 | 2006-03-14 | Yi |
| 4,931,662 |   | 1990-06--5 | Burton |

FIELD OF USE

The present device transforms the rise and fall of ocean waves to different forms of energy. The device includes a float, a rigid beam and an elastic beam which is forced to deflect when it reaches stop means or latch means while it pivots.

DESCRIPTION OF THE PRIOR ART

Harnessing renewable energy from the ocean has inspired the design of many ocean wave energy converters in recent years. The wave energy conversion techniques can be distinguished according to their operating principles in three major categories: oscillating bodies, over-topping reservoirs and oscillating water columns.

Oscillating bodies, floating or submerged, activate the oscillatory motion of body parts of a device, relative to each other, or of one body part, relative to a fixed reference, transforming the ocean wave energy into mechanical usable energy. This mechanical energy is then utilized to drive an electrical generator and create electricity. An example of this method is a big panel, hinged in the bottom of the sea near shore, which is pushed by the waves, pumping water to be stored in a tank ashore (www.aquamarinepower.com). Another design is a submerged structure composed of cylindrical floating sections linked by hinged joints, utilizing the oscillatory motion relative to each other to move an electrical generator (www.pelamiswave.com). Another device, features a big buoy submerged offshore, which oscillates up and down, with the rise and fall of waves, in order to drive a linear electric generator inside the buoy (www.oceanpowertechnologies.com). The obvious way to transform the oscillatory mechanical energy harnessed by the rise and fall of the ocean waves, directly into electricity, is to use an oscillating linear generator. Linear generators, though, are not as efficient in producing electricity compared to rotational ones. To make up this lag in efficiency and produce more electricity, designers have constructed huge buoys, in order to fit in more armature and windings. The results have been the construction of structures with the size of a building with many floors that require large investments and which, are at a high risk since they operate submerged offshore.

Over-topping reservoirs are elevated tanks designed to collect ocean water at a level a little higher than the sea level, which is then falling back to the ocean rotating a hydraulic turbine. Their main goal is to produce electricity with a rotational electric generator.

Oscillating Water Columns trap waves in chambers to cause an air column to compress and decompress in order to rotate an air turbine.

It is less obvious, however, how to transform the oscillatory mechanical energy harnessed by the rise and fall of the ocean waves directly into electricity, through the rotor of a rotational generator. An example is described in U.S. Pat. No. 7,444,810, where the rise and fall of the waves is transformed to mechanical energy, which is then applied directly on to a rotational generator. This patent mentions, though, the need to use gears in order to achieve more rotations per minute (rpm) and succeed more optimal operation of the generator. However increasing rpm compromises torque. It is the slow nature of the rise and fall of the waves resulting in slow mechanical rotation, which necessitates the assistance of gears to achieve higher rpm. This major drawback addresses the ocean energy converter described herein, which transforms the initial slow and "leisured" form of reciprocating motion of the waves into a faster form, which in turn leads to more rpm without compromising torque. The latter can become an input to a rotational generator transferring its speed to the rotor, forcing the rotor to produce more revolutions per minute thus generating more electricity. Another embodiment described here, uses a counter-rotating generator which results in even more revolutions per minute. In addition, the device described in this document, transfers all ocean wave energy conversion activity out of the ocean water, thus: a. simplifying the conversion process further, b. providing with low development and maintenance costs and c. assuring easy withdrawal, at the end of life-cycle.

There were a few attempts to transfer the energy of the waves with the use of a float and a lever, such as the one described in U.S. Pat. No. 7,012,340. In this attempt a lever having at its end attached a magnet, activates a linear generator. Another attempts is described in U.S. Pat. No. 7,468,563. The first one uses the mechanical advantage of a lever in reverse. The side of the lever from the pivot to the resisting force is longer than the side from the fulcrum to the applied force, which is the buoyant force of the ocean exercised on the pivot. Both lever sides are made of the same material. The lever is used in order to drive an air piston. U.S. Pat. No. 4,931,662 describes an apparatus which uses a rigid beam, supported by a pivot. Both sides of the beam are made from the same rigid material. The one end of the beam is attached to a float. The other end powers a hydraulic pump to drive a hydraulic motor.

An attempt to utilize a counter-rotating electric generator is described in U.S. Pat. No. 7,352,073. This patent utilizes a generator with two rotors, rotating coaxially, one inside the other. Their rotation is activated by a reciprocating drive rod. However, this reciprocating drive rod drives the two rotors sequentially and not concurrently, that is, the inner rotor is activated on the downstroke of the drive rod and the outer rotor on the upstroke of the drive rod. The device described herein, counter-rotates both rotors in both the downstroke and the upstroke, providing increased relative speed in the magnetic field that improves electrical performance.

Another embodiment described here, uses the mechanical energy produced by the device, to produce electricity, not through an electromagnetic-based generator but through piezoelectricity.

Piezoelectric elements produce electrical potential, if a periodic varying mechanical force is used to compress them. There are a few materials possessing the piezoelectric effect capability including quartz, tourmaline, Plumbum Zirconate Titanate (PZT) and Plumbum Magnesium Niobate (PMN). PZT and PMN are ceramic materials, which have shown high efficiencies in generating electrical power, when mechanical stress is applied periodically. Several devices are available utilizing these ceramic materials to produce electrical potential. One of them is to create a stack of thin layers of these materials. Each layer may be rectangular or have the shape of a disk. These layers are separated by thin metallic electrodes. The typical layer thickness is 1 mm or less per disk or plate, bonded together. These stacks can withstand the pressure of several tons. Piezoelectric stacks are mounted by gluing them on metal or ceramic surfaces by cold or hot curing epoxy, respectively. A guiding casing is essential when heavy loads move dynamically. This guiding casing usually includes a preload spring. These stacks have their own characteristic stiffness. The preload spring must have 10% or less of the stack's stiffness for optimum performance. The maximum permissible forces depend on the displacement of the corresponding stack(s). A typical stack displacement is less than 1 mm. Each stack, when activated can generate more than 1000 Volts. These piezoelectric devices can perform billions of cycles without any measurable wear. In practical terms their lifetime exceeds 30 years. There are a few companies manufacturing such piezoelectric configurations. The electrodes of these devices can be connected in series, which maximizes the combined voltage or in parallel, which, when connected to additional circuitry, the current is maximized. Combined schemes are possible. Advances in power electronics have allowed the electrical potential generated by these piezoelectric configurations to deliver useful electrical power in AC or DC form, which can be stored in capacitors or be fed in the electricity grid. High power harvesting has been attempted recently i.e. www.innowattech.com.

A main feature of the embodiment described herein besides simplicity, is the minimal mechanical motion necessary in order to generate electricity.

SUMMARY

A device comprising a float and a pivoting assembly of two beams, a rigid one and an elastic one, firmly connected to each other, pivoting about a stationary point. The device transforms the rise and falls of the ocean waves into usable mechanical energy. In one embodiment, the elastic beam is latched into a latch mechanism, such as a spring-bolt. The latch mechanism is positioned to obstruct the elastic beam to continue moving for a fraction of the ocean waves' half period. This brief obstruction of the elastic beam's pivoting, causes it to deflect and accumulate potential energy. When the elastic beam is released, moves with a high speed and momentum. In another embodiment this momentum is utilized to counter-rotate an electric generator with two rotors.

In another embodiment the elastic beam is obstructed to stop moving completely, by a stop mechanism, comprising piezoelectric elements. Electrical power is generated by the elastic beam's periodic compression.

A method of transforming the energy of a mass in reciprocating motion to electrical power utilizing a counter-rotating electrical generator is presented.

LIST OF FIGURES

FIG. 2a shows the elastic beam obstructed by one latch means

FIG. 2c shows the elastic beam obstructed by one latch means in a wave trough

Figure 3B:
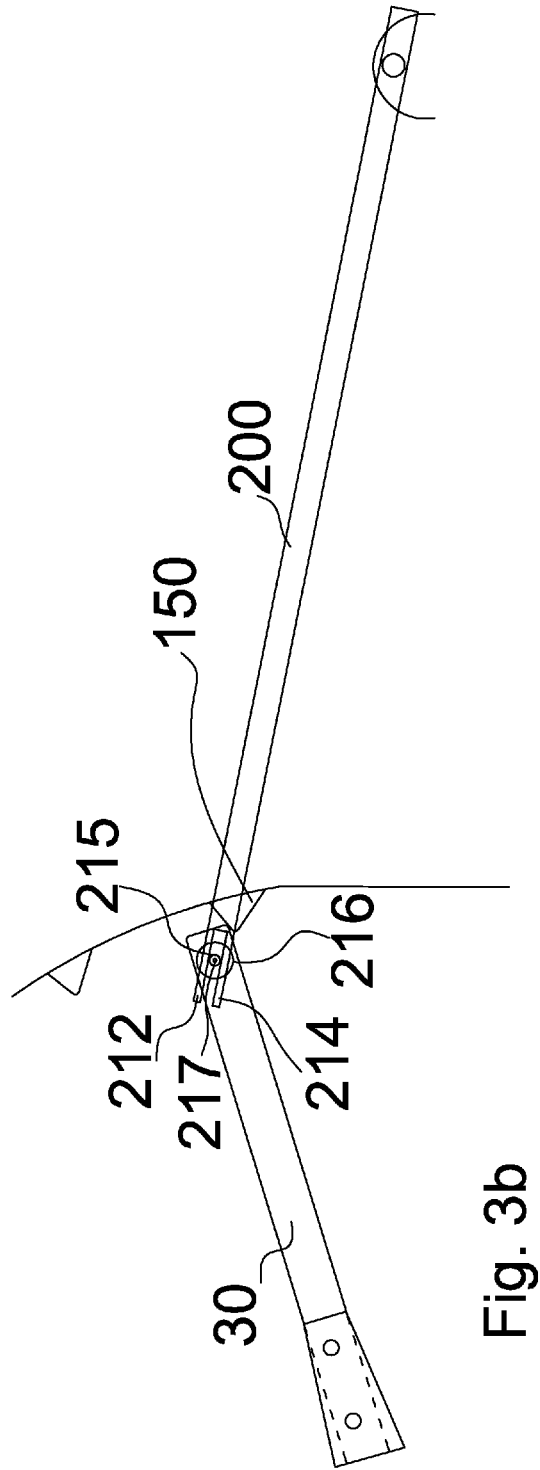
Figure 3C:
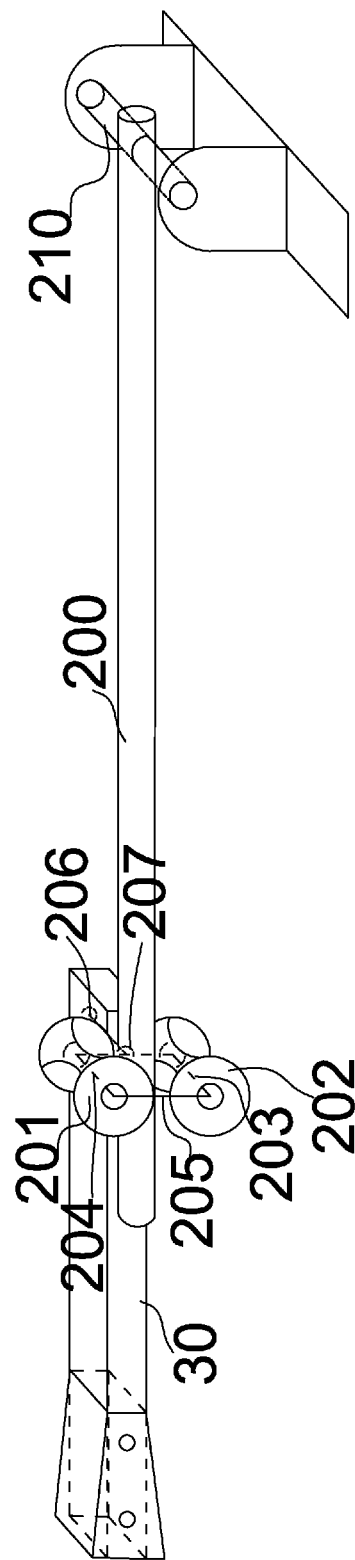
Figure 3D:
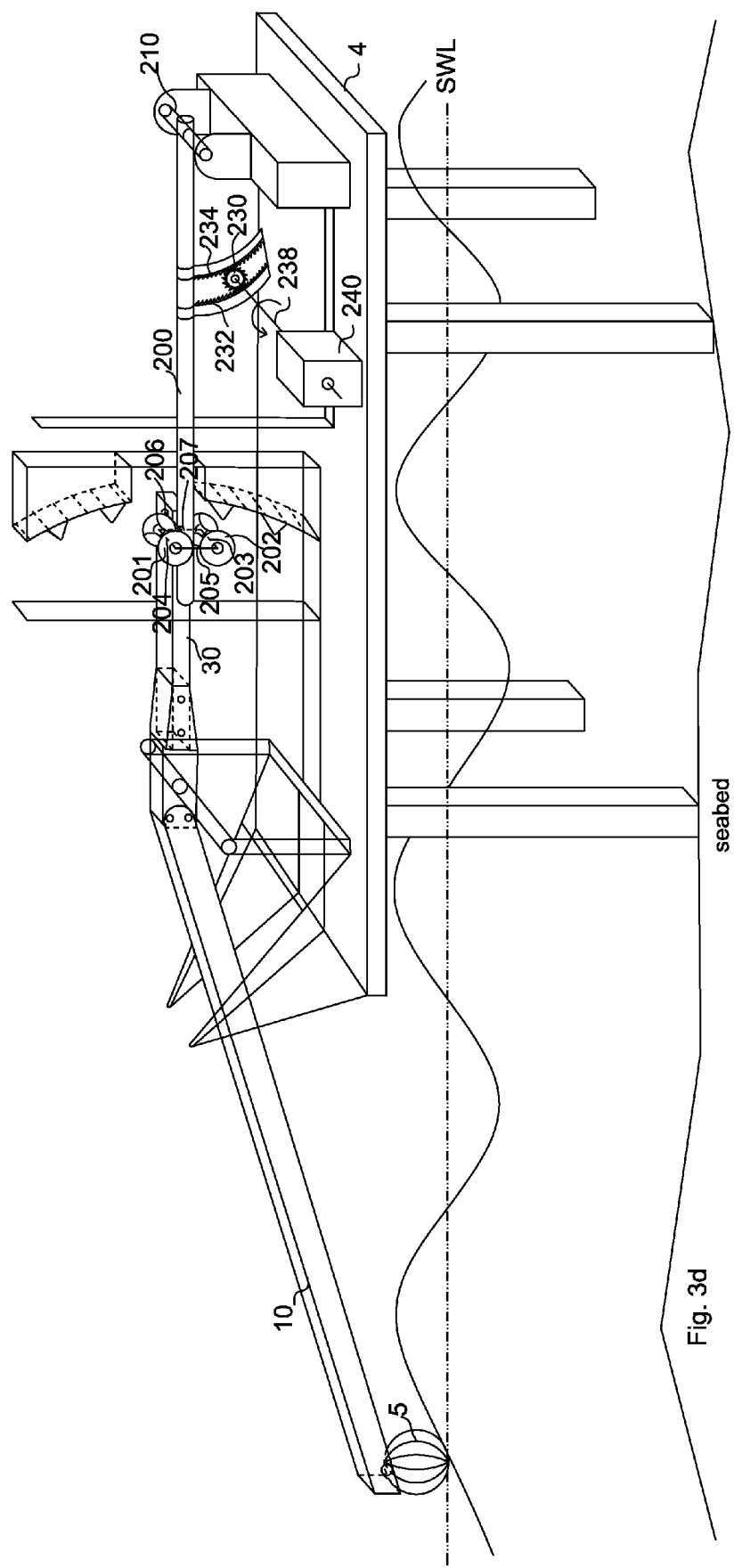
Figure 3G:
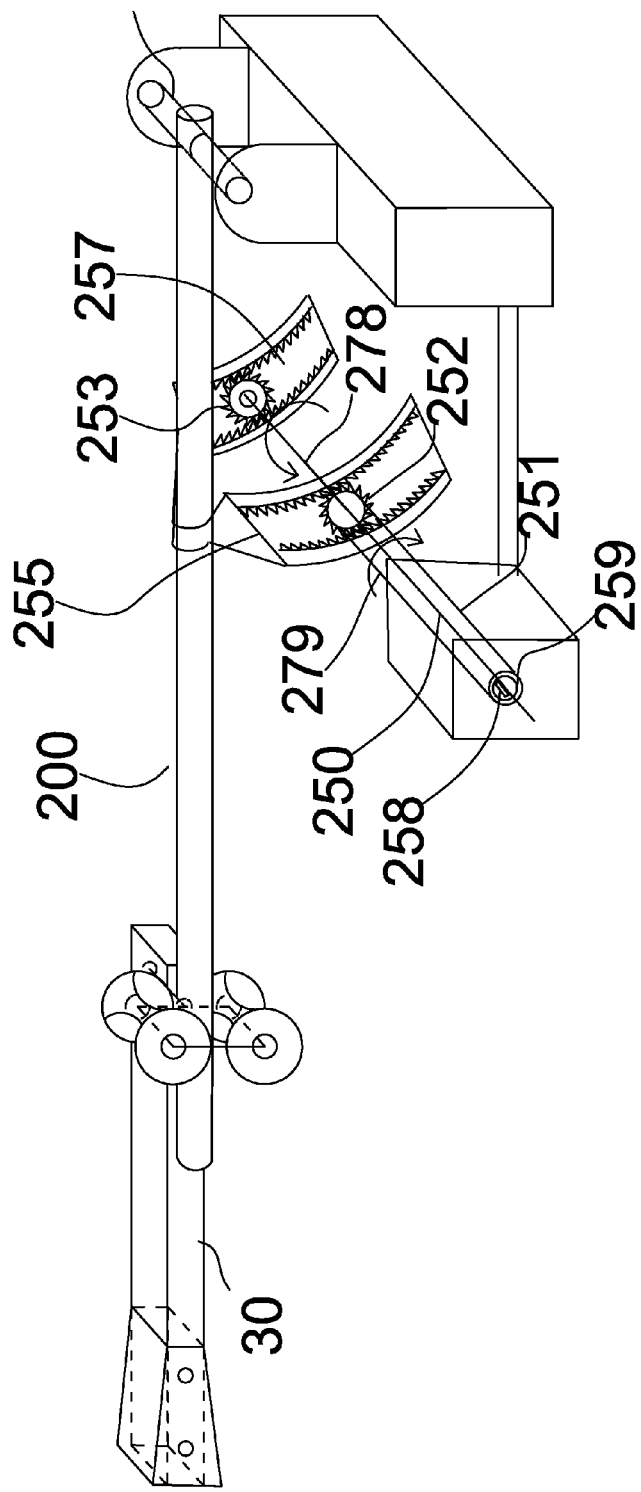
Figure 3H:
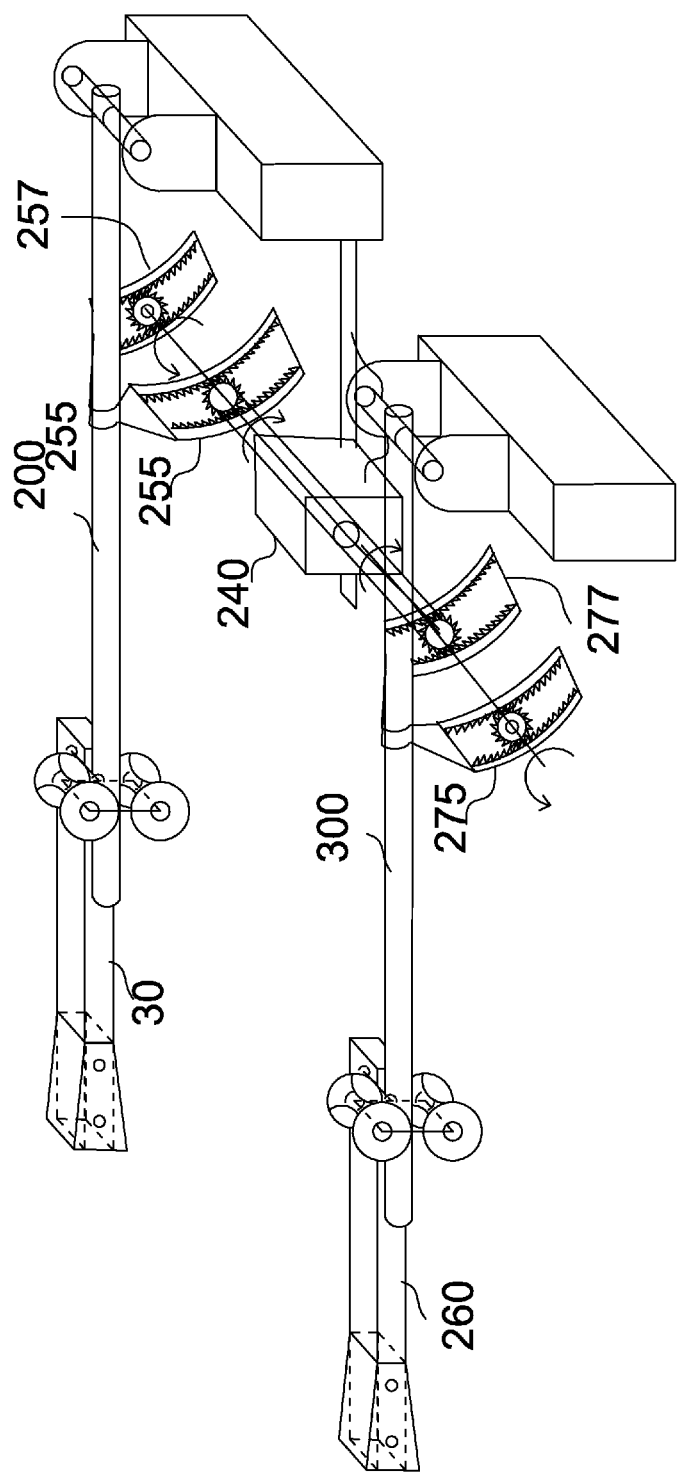
Figure 4A:
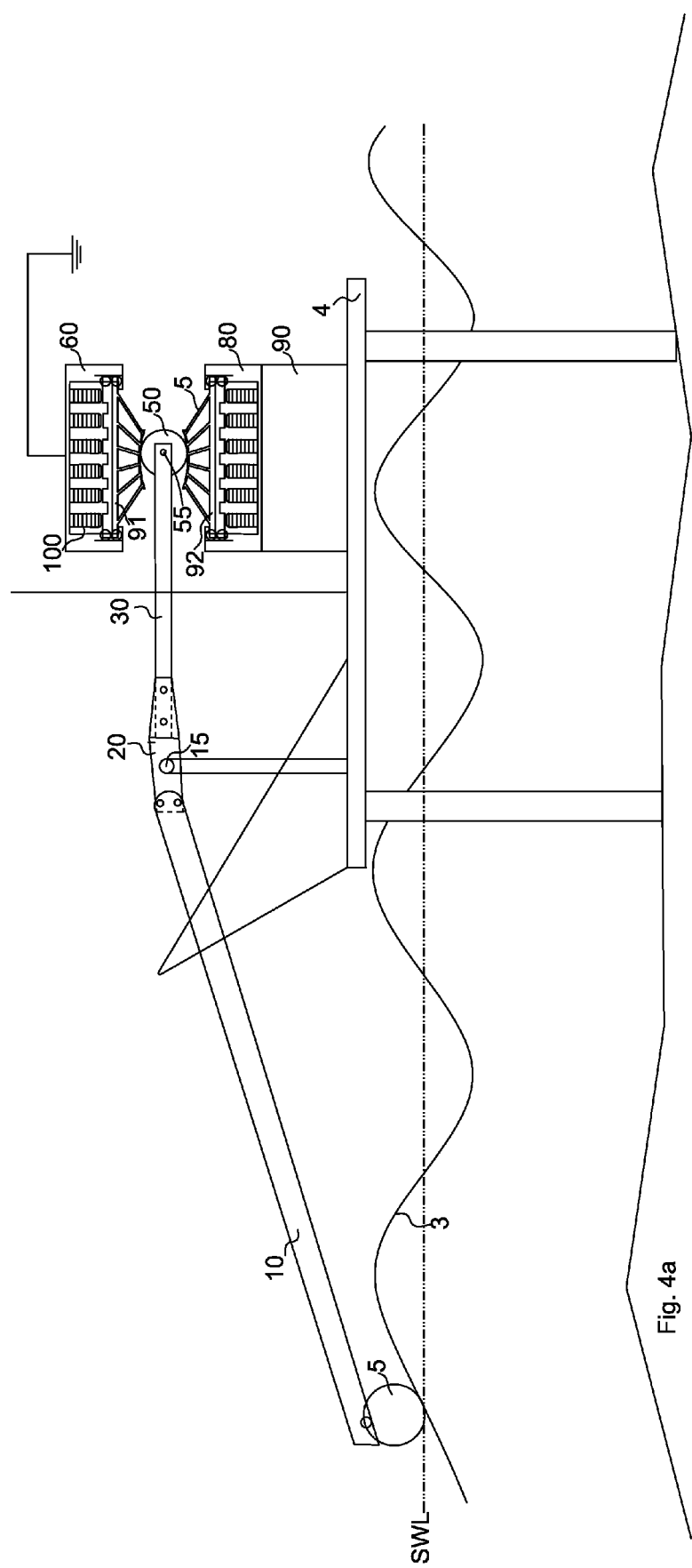
Figure 4C:
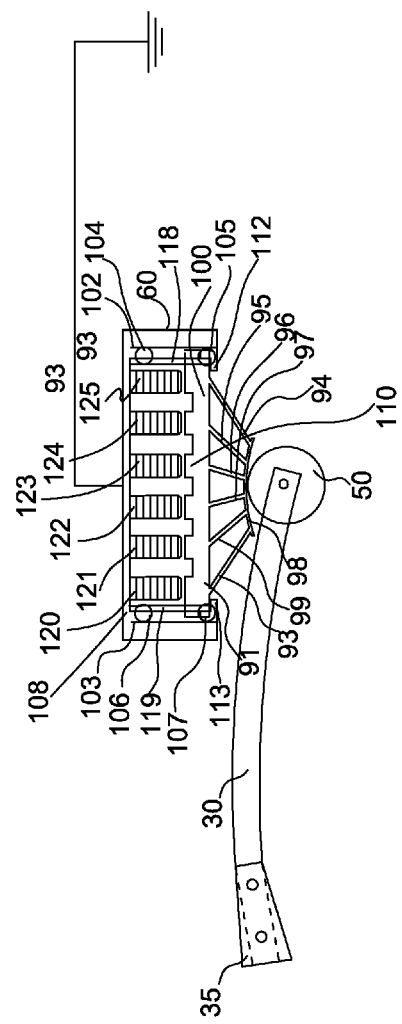
Figure 4D:
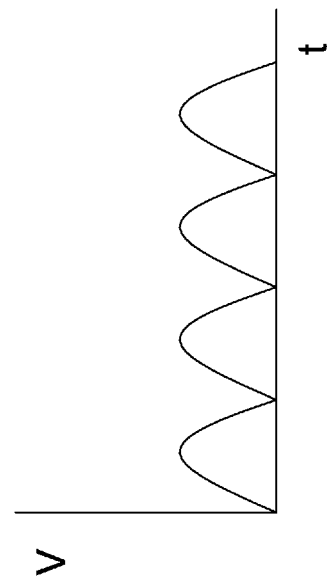

FIG. 3a shows the pivoting beam assembly with float and latch means driving an electric generator FIG. 3b and FIG. 3c show coupling means FIG. 3d shows a perspective view of the pivoting beam assembly with float driving a rotational generator FIGS. 3e and 3f show the ratchet and pawl operation FIG. 3g shows ratchet and pawl operation on a two rotor electrical generator FIG. 3h shows two elastic beams driving a counter-rotating electric generator FIG. 3i shows two pivoting beam assemblies with floats having rigid beams of different length FIG. 4a shows a pivoting beam assembly with float and 2 piezoelectric stop means in SWL FIG. 4b shows a pivoting beam assembly with float and 2 piezoelectric stop means in a wave trough FIG. 4c shows an elastic beam compressing piezoelectric stacks FIG. 4d shows the voltage output of piezoelectric stacks compressed by an elastic beam

DETAILED DESCRIPTION

The device subject of this disclosure relates to a pivoting beam assembly with a float pivoting about a pivot to harness and transform the energy of ocean waves to different forms of energy. The pivoting beam assembly with float comprises a rigid beam, an elastic beam, a connector such as a sleeve connector and a buoyant float. The first end of the rigid beam is attached to the float and the second end is firmly connected to the one end of the connector; the other end of the connector is firmly connected to the first end of the elastic beam.

The pivoting beam assembly with float pivots about a pivot with the reciprocating up and down motion of the ocean waves. The pivot is positioned on a stationary place, such as a platform, above the surface of the ocean or on shore land, or on a breakwater. Also, the platform may be on top of a considerably heavier floating platform. Typically, when the float is at the Still Water Level (SWL), the elastic beam is positioned horizontally and pivots up and down with the wave trough and crest respectively. The rigid beam can be connected at an angle suitable to reach the water surface. The device transforms the rise and falls of the ocean waves into mechanical energy with the pivoting motion of the pivoting beam assembly with float. In one embodiment, the second end of the elastic beam is latched into a latch mechanism, such as a spring bolt. The latch mechanism has a dual function: a.

it is positioned to obstruct the second end of the elastic beam to continue moving for time no more than a fraction of the ocean waves' half period, when it moves from the uppermost or lowermost end of its pivoting path and towards the midpoint of this path and b. it allows the elastic beam's second end to pass freely in the opposite direction. The obstruction forces the elastic beam to deflect, due to the mechanical stress applied to it caused by the buoyant and gravitational forces of the float. There is a point as the elastic beam deflects that its projection on a straight line is short enough to overcome the obstacle of the latch mechanism. The time that the elastic beam's second end will remain obstructed is a function of the elastic beam's elasticity, or young modulus, and the distance the latch mechanism will be placed at from this end. The deflection should not exceed the elastic beam's elasticity capability in order to prevent bending or breaking of the elastic beam.

As the beam deflects, it accumulates potential energy, which is instantly released when it overcomes the latch means. At that point the deflected beam fast returns to its un-deflected shape, catching up at the same time with the pivoting motion of the pivoting beam assembly with float. That is, the elastic beam thrusts to get in the position it had to be, if the obstruction of the latch mechanism had never been applied. The instant release of this potential energy causes the elastic beam to pivot with higher speed and momentum, which can be used to move another object with similar speed and momentum.

This may be an application of the impulse-momentum theorem of physics, according to which, if a spring-like force, like the one caused by the deflected beam, is applied on an object for a small time interval or instantly, the effect of this force or, impulse (thrust), increases the momentum of the object. In our application, the elastic beam can be further coupled with an object such as rotor of any electrical generator, linear or rotational, causing it to move with higher velocity resulting in the increased efficiency of the generator output. This result also demonstrates the utility of the pivoting beam assembly with float device in a variety of applications.

In another embodiment the second end of the elastic beam is obstructed to stop moving completely, by a stop mechanism, without being able to overcome it. In this case, the elastic beam deflects and a force is applied by it to the stop mechanism. In the same embodiment the stop mechanism comprises at least one piezoelectric element. The periodic push that the second end of the elastic beam exercises on the piezoelectric element, due to the pivoting of the elastic beam, generates electricity. Another embodiment has the second end of the elastic beam "sandwiched" by piezoelectric stops means from both sides, up and down. The second end of the elastic beam is almost totally immobilized and electricity is generated periodically every half wave period. The second end of the elastic beam has only a small margin to move slightly back and forth to only accommodate the deflection movement.

Figure 1:
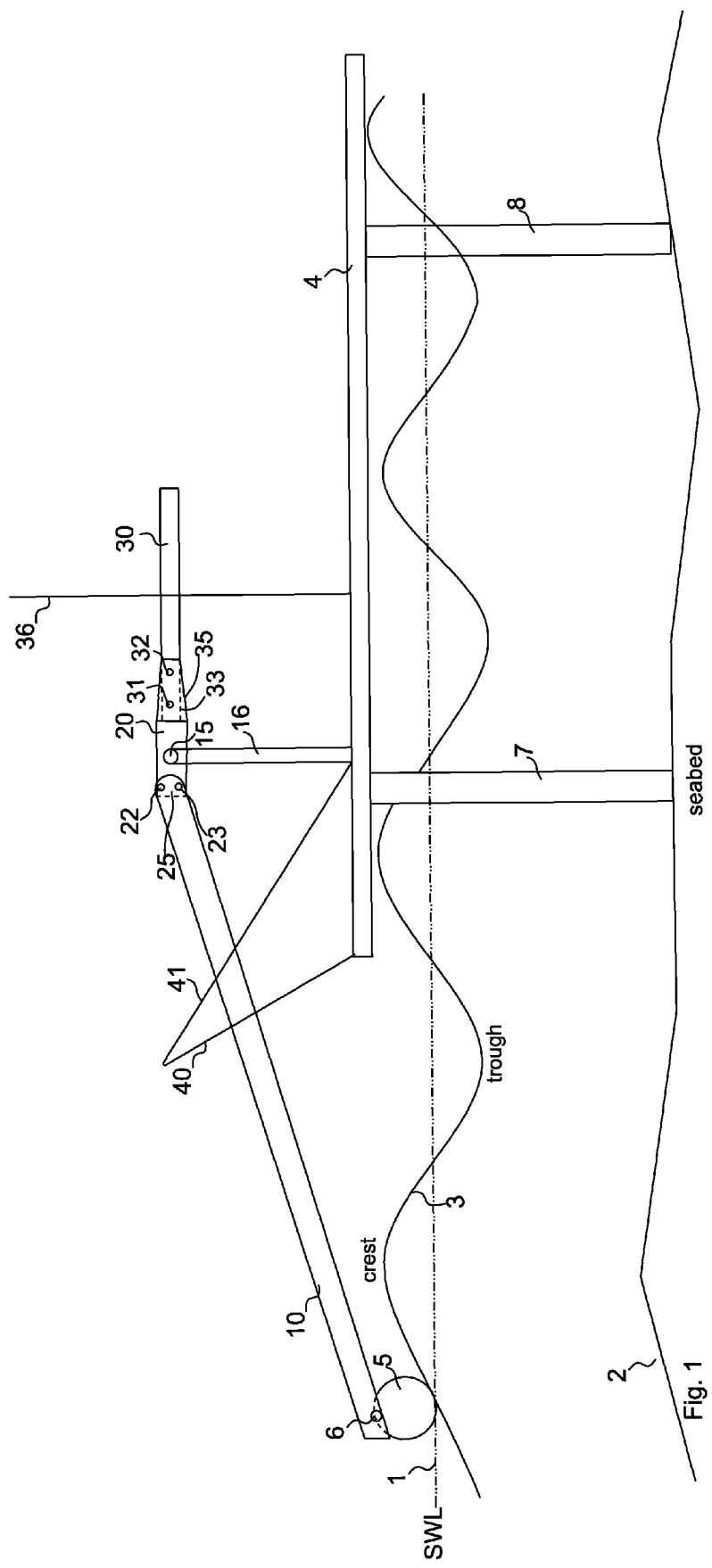
FIG. 1 shows the rigid beam and the elastic beam on the platform

In FIG. 1, rigid beam 10 extents from the pivoting point 15 towards the ocean. A float 5 is attached with attachment link 6 to the ocean end, or first end of the rigid beam. The second end of the rigid beam is firmly connected with bolts 22 and 23 to the ocean side end 25 of a pivoting connector 20, which rotates freely about the pivoting point 15. The platform end of the pivoting connector 35, firmly attaches the first end of the elastic beam 30 with bolts 31 and 32. FIG. 1 shows the part of the elastic beam 33, which is inside the connector's sleeve 35. The elastic beam 30 extends from the pivoting connector 20 towards the side of platform 4. Platform 4 is shown to be supported in seabed 2 with legs such as 7 and 8. FIG. 1 depicts a side view.

The elastic beam 30 can be either aligned to the rigid beam 10, forming a straight line or form an angle with it, as shown in FIG. 1. A hydraulic means, (not shown), can drive the rigid beam as a crane's boom, from the pivoting point, thus adjusting it firmly in the desired angle. The same hydraulic means is capable of lifting the float out of the water and fetching it close to the pivoting point with a motor operated conveyor chain (not shown). In another embodiment also not shown, the rigid beam is assembled in smaller rigid pieces of different cross-section sizes and capable of being extended or retracted in an antenna or telescopic format like a telescopic crane boom.

FIG. 1 shows the elastic beam 30 in its typical position, which is to be horizontal while float 5 is at the Still Water Level 1 (SWL). Optional protective guides 40, 41 and 36 assist beam 30 to secure its motion in a vertical plane. Rigid beam 10, elastic beam 30, pivoting connector 20 and float 5 comprise the pivoting beam assembly with float. The pivoting assembly with float pivots freely about pivoting point 15, in response to the waves' motion exercised on float 5. As float 5 moves up, forced by the buoyancy force the second end of elastic beam 30 moves down. As float 5 moves down, due to its weight, the second end of the elastic beam moves up.

FIG. 2a shows float 5 in a wave trough position going towards crest. The ocean waves 3 move towards the direction of the arrow. Float 5 and rigid beam 10, due to buoyancy, push elastic beam 30 downwards. Latch means 150, supported on secured and fixed on the platform structure 170, obstructs elastic beam 30 to continue pivoting downwards, momentarily. The elastic beam 30, having enough elasticity, will continue its motion towards mid-point 143 and will bypass latch means 150. The elastic beam will release its accumulated potential energy, due to deflection, developing high speed and momentum directed downwards. When the elastic beam 30 starts going upwards again, its second end will simply push latch means 150, which will pivot around pin 141 and enter socket 144. Socket 144 is formed on structure 170. As a result it will pass freely the latch means, which will return into its previous position, out of socket 144, pushed by spring 142.

Figure 2B:
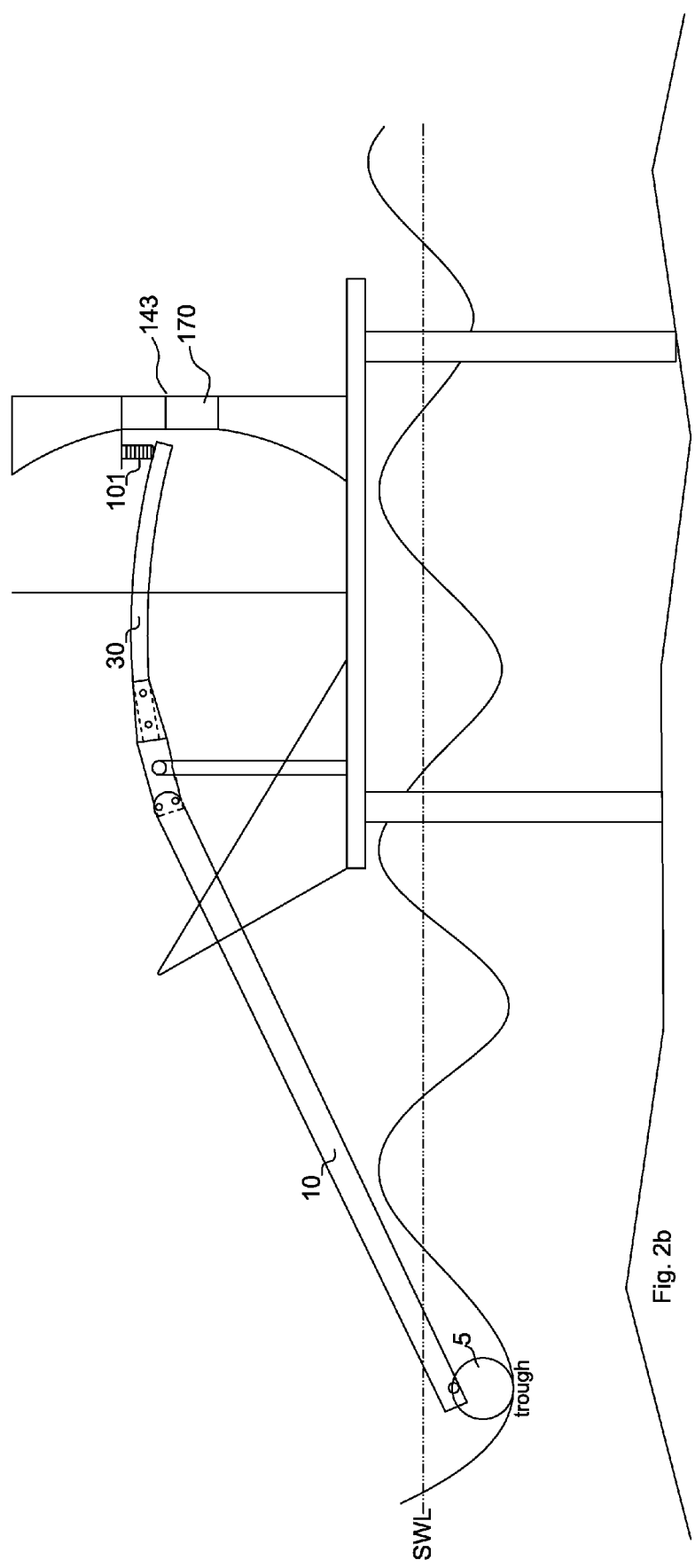
FIG. 2b shows the elastic beam obstructed by a stop means in a wave trough

FIG. 2b shows an embodiment where the stop means is piezoelectric stack 101, supported on structure 170. Elastic beam 30 deflects due to the weight of the float, as the float is in a wave trough. Piezoelectric stack 100 does not allow the elastic beam to overcome its stop function and the elastic beam compresses the piezoelectric elements within the stack. The piezoelectric stack converts the accumulated potential energy of the deflected beam into electricity, as it is described in more detail further in this disclosure.

Another embodiment employs only one latch means 145, set in the middle of structure 170, as shown in FIG. 2c. This latch means obstructs the motion of elastic beam 30 in both directions, momentarily until the elastic beam overcomes its obstruction due to deflection, as explained further above.

Figure 2D:
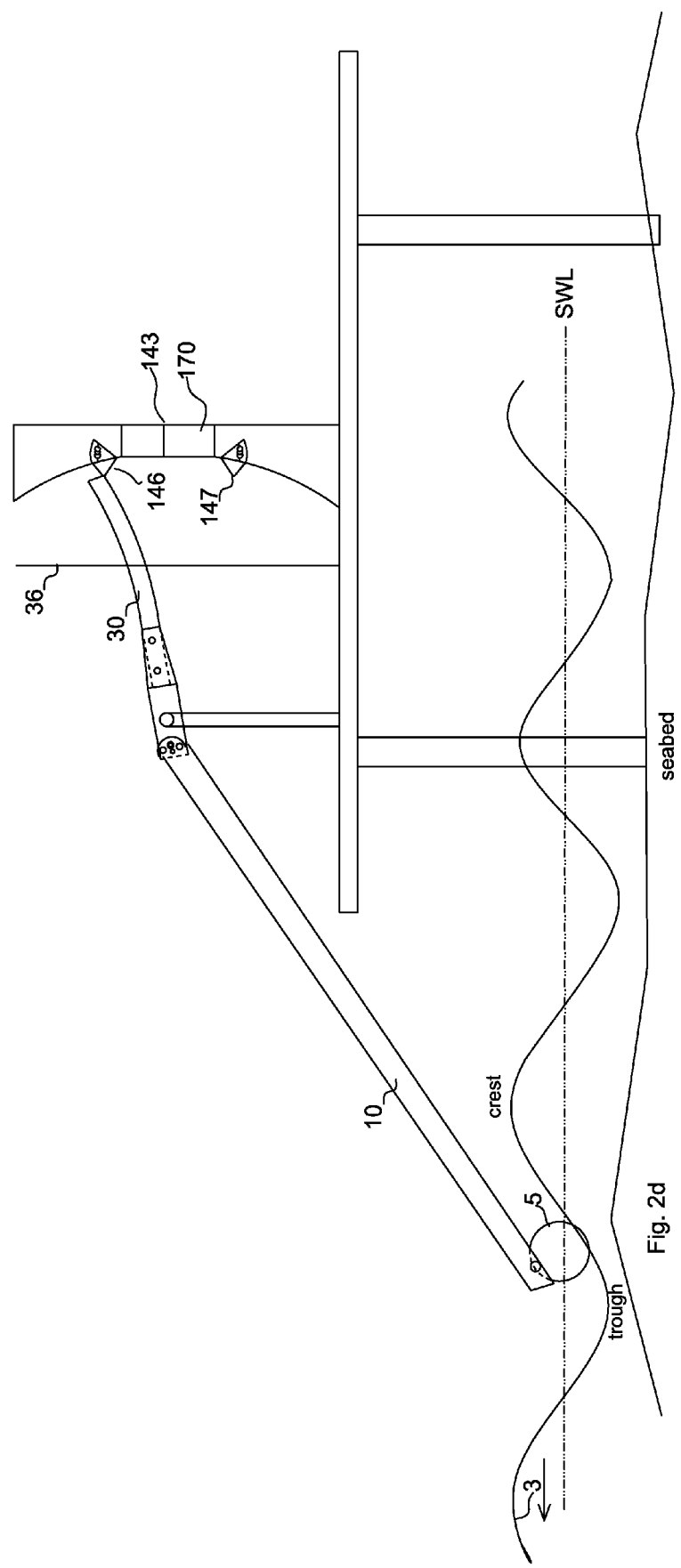
FIG. 2d shows the pivoting beam assembly with float and two latch means

The embodiment shown in FIG. 2d employs an upper latch means 146 and a lower one 147. The latter is positioned to obstruct the elastic beam 30 in the direction from the lowest point of its pivoting path towards the middle point. The former is obstructed when the beam travels from its highest pivoting position towards the mid-point of the pivoting path. Both latch means have sockets and springs, as shown in FIG. 2d, to allow the beam's movement when it moves in the direction from mid-point 143 towards the upper or the lower end of the arc of its pivoting path. Latch means 146 and 147 can be adjusted higher or lower from their indicated positions, along the arc of structure 170, in order to accommodate higher and lower waves.

Figure 2E:
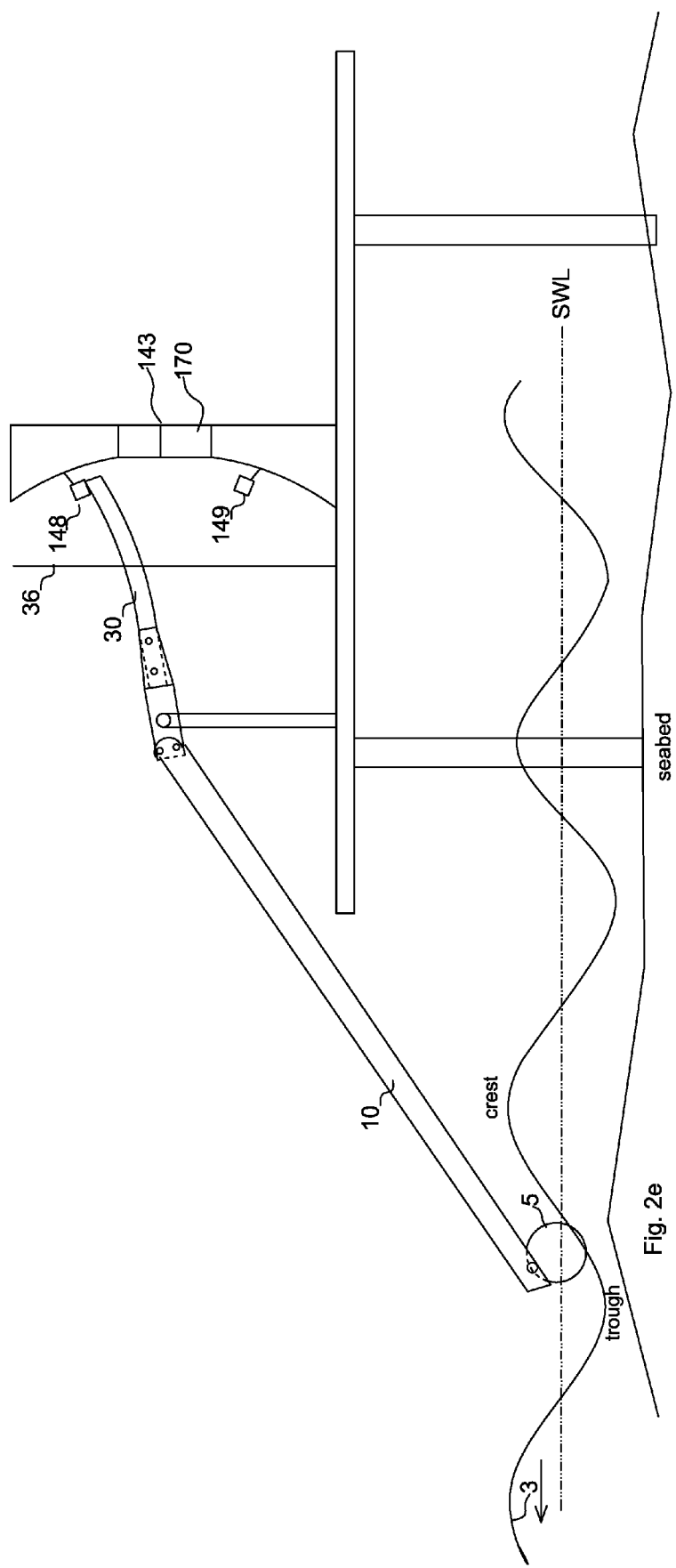
FIG. 2e shows the elastic beam obstructed by a magnetic latch means

Another embodiment shown in FIG. 2e has as upper and lower latch means 148 and 149 respectively. These latch means are magnets or electromagnets and can attract the second end of elastic beam 30, if it is covered by a magnetic material, or magnets. Magnets 148 and 149 can be adjusted higher or lower, along the arc of structure 170, in order to accommodate higher and lower waves.

Figure 2F:
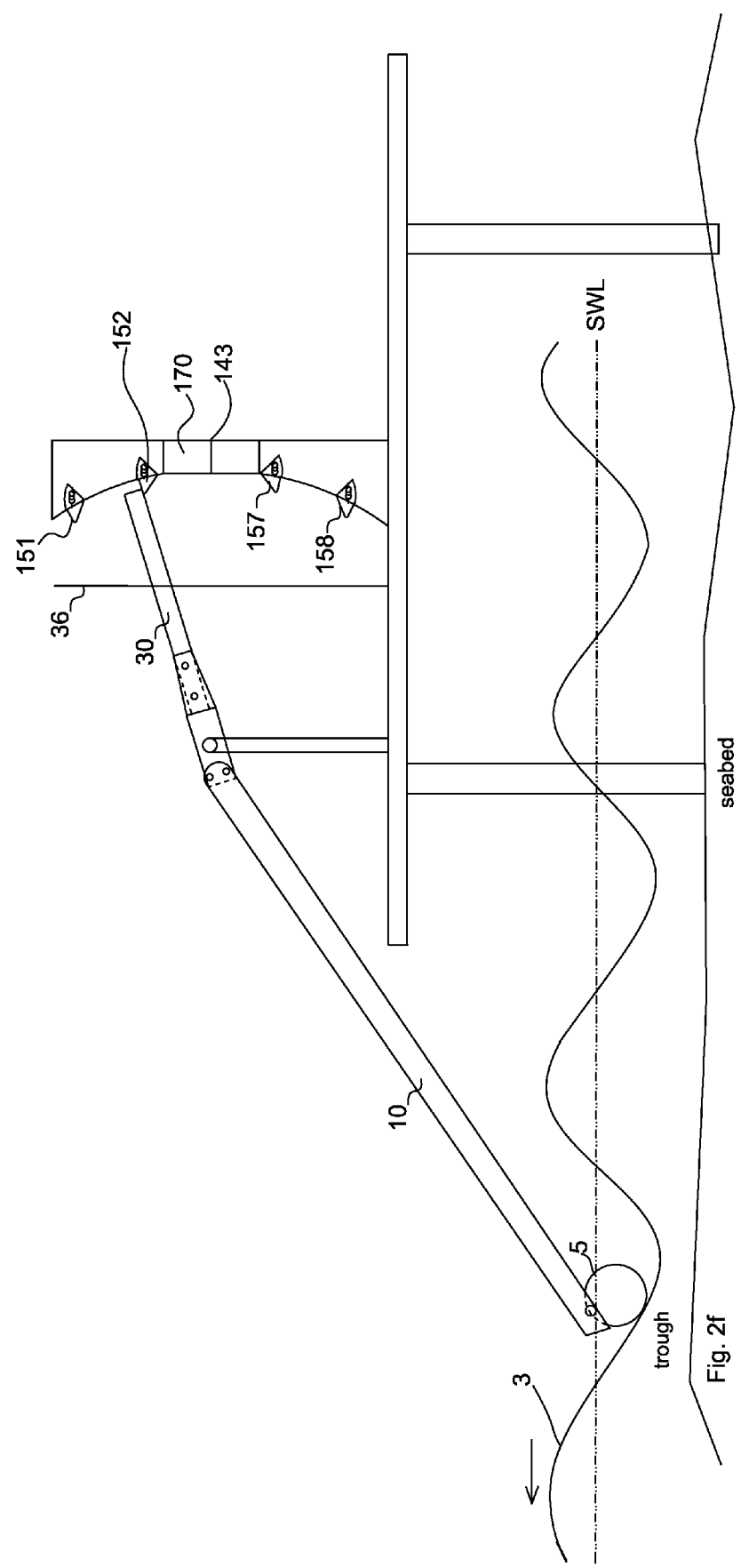
FIG. 2f shows the elastic beam obstructed by four latch means

Another embodiment involving four latch means with sockets and springs is depicted in FIG. 2f. Latch means 151 and 152 are placed in the upper half of the pivoting path arc, have the same orientation and allow elastic beam 30 to move freely in the direction from the mid-point 143 towards the upper end. Opposite orientation have latch means 157 and 158, which are positioned in the lower half of the arc and allow elastic beam 30 to pass freely in the direction from the mid-point to the lower end. The beam is obstructed when it travels from the ends of the arc towards the mid-point. When the waves are high, the beam is first obstructed by the uppermost or lowermost latch means, 151 and 158 respectively. The beam deflects, momentarily and then it releases its accumulated energy moving with high speed to the next obstruction of latch means 152 or 157 respectively. The beam is obstructed again momentarily, by these latch means accumulating potential energy as well, which is also released, thus providing multiple high speed releases within one ocean wave period.

FIG. 3a depicts another embodiment, having a pivoting beam assembly with float and latch means system driving a rotational generator with ratchet and pawl mechanisms. In this figure, elastic beam 30 is coupled together with lever arm 200. Lever arm 200 receives the motion of the elastic beam and pivots about distant pivot 210. Distant pivot 210 is supported by a pair of side supports, such as the side support 225 shown in this side view. The side supports are based on base 220. Lever arm 200 has a split at its proximate to the elastic beam end, with split ends 212 and 214, which leave a space in between them, in order to couple the second end of elastic beam 30.

FIG. 3b shows the coupling means. Bolt 217 is bolted on the side of the second end of elastic beam 30. Fixed on this bolt is bearing 215. The opening between split ends 212 and 214 is spaced enough to fit bearing 215. Bolt 217 extends all through the split ends opening. Disk 216 is firmly connected with bolt 217, keeping lever arm 200 secure in place. This is one way to succeed coupling between elastic beam 30 and lever arm 200.

Another way to succeed coupling between elastic beam 30 and lever arm 200 is shown in FIG. 3c. Spools 201 and 202 can rotate freely about shafts 204 and 203 respectively. These shafts are connected with connecting rods 205 and 207. Connecting rod 207 is connected to a bearing such as bearing 215, mentioned above, which can rotate freely about a bolt like bolt 217, which was also mentioned above.

FIG. 3d shows a perspective view of the pivoting beam assembly with float, the latch means and the mechanism to rotate a rotational generator. The coupling of elastic beam 30 and lever arm 200, allows elastic beam 30 to transfer its momentum and velocity to lever arm 200. Firmly attached on lever arm 200 is a ratchet and pawl mechanism with two arc shaped ratchet racks, reciprocating up and down. Concave ratchet rack 232 comprises spring-loaded teeth showing downwards. Convex ratchet rack 234 comprises spring-loaded teeth facing upwards. Both ratchet racks' teeth engage the teeth of a freewheel gear 230, which is firmly attached to driveshaft 238 of a rotational generator 240. The power transmission of freewheel gear 230 to driveshaft 238 is shown in the figure to have a counterclockwise angular direction. The power transmission from concave ratchet rack 232 to freewheel gear 230 occurs when lever arm 200 moves downwards. Convex ratchet rack 234 provides power transmission, when lever arm 200 moves upwards. Both ratchet racks allow the opposite to their corresponding power transmission move to happen freely, because the spring-loaded teeth can be pushed in their sockets by the freewheel gear teeth.

The freewheel gear can also freely rotate clockwise, thus allowing driveshaft 238 to rotate counterclockwise, freely, when the latter develops higher angular velocity.

FIGS. 3e and 3f explain the counterclockwise power transmission to driveshaft 238 in more detail. For simplicity in understanding the motion, ratchet rack 232 is shown separately from the ratchet rack 234. However, the related embodiment which was described previously and depicted by FIG. 3d integrates them together under lever arm 200. Back to FIGS. 3e and 3f, lever arm 200 moves up and down in response to wave action. Concave ratchet rack 232 transmits power and rotates driveshaft 238 counterclockwise only in the downstroke. Concave ratchet rack 232 moves freely in the upstroke. During upstroke, convex ratchet rack transmits power and rotates driveshaft 238 counterclockwise, while it moves freely in the downstroke. As a result, driveshaft 238 is rotated both in the downstroke and the upstroke, as shown in FIG. 3d, and always in the same angular direction, that is counterclockwise.

A plurality of such reciprocating ratchet and pawl mechanisms including a concave and a convex ratchet rack, like the one described, can act on driveshaft 238 in either side of generator 240. These ratchet and pawl mechanisms can be driven, firmly attached to one lever arm, or to different lever arms, moving independently from each other, driven by separate, corresponding pivoting assembly beams with float systems.

Techniques for coupling driveshaft 238 with the electrical generator shaft are well known. The rotation of driveshaft 238 supplies mechanical energy to electrical generator 240. The electrical generator 240 may be AC or DC.

Another embodiment comprises a pivoting beam assembly with float and a lever arm with reciprocating ratchet mechanisms rotating a generator with two rotors. This embodiment is depicted in FIG. 3g. Elastic beam 30 is coupled with lever arm 200, which supports two sets of ratchet and pawl mechanisms 257 and 255. The two rotor electromagnetic generator has an inner rotor 250 and an outer rotor 251, surrounding the inner rotor. The outer surface of the inner rotor has at least one magnet 258 and the inner surface of the outer rotor has at least one coil 259. The inner rotor receives power transmission from reciprocating ratchet and pawl mechanism 257, which rotates freewheel 253, both in the upstroke and the downstroke and always in the same direction. Freewheel 253 is firmly attached to an inner driveshaft 278 driving the inner rotor 250, which carries the at least one magnet 258, forcing it to rotate counterclockwise. The outer rotor receives its power transmission from reciprocating ratchet and pawl mechanism 255, which rotates freewheel gear 252 clockwise. Freewheel gear 252 is firmly attached on an outer driveshaft 279, which surrounds the inner driveshaft 278 and drives the outer rotor, which has at least one coil. This way the coil 259 is rotated clockwise. The outer driveshaft 279 is shorter than the inner driveshaft 278, or on other words the inner driveshaft extends further from the surrounding outer driveshaft in order to expose space to have a freewheel gear attached, which in turn is capable of receiving power transmission from the corresponding reciprocating ratchet and pawl mechanism. As a result the at least one magnet is rotating in the opposite direction from the at least one coil, thus generating electricity. The generated electricity is further transferred from the at least one coil through slip rings (not shown).

Another embodiment employs a counter rotating generator, having outer and inner driveshafts extended from both sides, with inner driveshafts longer than the surrounding outer driveshaft. The rotors are supported to rotate on bearing means. Each side of the rotors receive power transmission from two different lever arms, which are coupled with two different corresponding pivoting beam assemblies with floats. As it shown in FIG. 3h, lever arms 200 and 300 are connected with two different pivoting assembly beams with floats that their corresponding elastic beams, 30 and 260 are coupled with lever arms 200 and 300 respectively. Lever arm 200 is driving two reciprocating ratchet and pawl mechanisms 257 and 255. Ratchet mechanism 257 drives the inner rotor counterclockwise. Ratchet 255 drives the outer rotor clockwise. Lever arm 300 drives two reciprocating ratchet and pawl mechanisms 275 and 277. Ratchet mechanism 275 drives the inner rotor counterclockwise. Ratchet mechanism 277 drives the outer rotor clockwise. Thus, each rotor has two sources of power transmission, coming from the corresponding pivoting beam assemblies with floats. These pivoting beam assemblies with floats may be identical to each other or have rigid beams of different size. In the case of the rigid beams with different size, the corresponding floats are not in the same crest and trough positions. This allows for more continuous rotation of the rotors, since when the one float reaches the uppermost or lowermost position on the ocean wave and it stops in order to start moving towards the opposite direction, the other float is in motion thus providing rotation to the rotors. FIG. 3i shows two pivoting beam assemblies with corresponding floats. The rigid beam 11 is shorter by a quarter of a wavelength from rigid beam 10. While rigid beam 11 reaches its uppermost or lowermost point of its pivoting, it stops to start moving towards the opposite direction. At this instant rigid beam 10 is crossing through the SWL point and is in motion. This way the rotors driven by such pair or plurality of rigid beams never stop rotating.

Another embodiment utilizing as electricity generating means piezoelectric elements, driven by a pivoting beam assembly with float is shown in FIG. 4a. Cylinder 50, which is made of steel or hard rubber, is attached to the second end of elastic beam 30 with shaft 55. The cylinder can rotate about the shaft. Above and below cylinder 50, housings 60 and 80 of piezoelectric elements are fixed in position with regard to the cylinder and the elastic beam in its typical horizontal position. Between the cylinder and the housings, steel structures 91 and 92 surround, but do not compress, cylinder 50. When float 5 goes up and down following the waves' crest and trough, the cylinder pushes down and up, respectively, the steel structures, which in turn compress the piezoelectric housings 60 and 80.

FIG. 4b shows float 5 in a wave trough position. Float 5 and rigid beam 10, due to gravity, push the connector's sleeve 35 upwards. Elastic beam 30, being connected firmly to sleeve 35 with bolts 31 and 32 is pushed up as well. Cylinder 50, being prevented to move up by steel structure 91, compresses the arc shaped cylindrical surface 98, which is part of the steel structure 91. Due to elastic beam's deflection, cylinder 50 moves a bit horizontally towards the direction of sleeve 35, by rotating about shaft 55, while it is exercising its upward force on surface 93. Similar is the action of the elastic beam when it moves downwards, due to buoyancy forces, compressing steel structure 92. Elastic beam 30 can be made of metal, metal matrix composite, reinforced plastic or wood. The rigid beam can be made out of metal, such as rigid steel, to prevent deflection and protect from bending.

FIG. 4c shows a side view of steel structure 91, which is an integral part of housing 60 in order to complete the task of compressing the piezoelectric elements. Each one of these elements may be in the form of layers of piezoelectric material in a stack such as the six stacks shown in this side view: 120, 121, 122, 123, 124 and 125. The piezoelectric stacks consist of layers of piezoelectric elements. The layers can have a circular, square or rectangular shape and they are bonded to each other. Bonding techniques are well known. Piezoelectric materials include quartz, tourmaline and ceramic material, such as Plumbum Zirconate Titanate (PZT). Such ceramic materials in a stack configuration generate electrical potential when mechanical stress is applied periodically. Piezoelectric stacks are manufactured by several manufacturers.

FIG. 4c, also shows housing 60 having a plurality of piezoelectric stacks fixed on the one upper most surface 108. Steel structure 91 comprises a cylindrical surface 98, steel rods such as 94, 95, 96, 97, 93 and 99, side walls 118 and 119 and steel compressing surface 100. Steel structure 91 along with housing 60, is a <<compressing device>> for the compression of piezoelectric stacks. Steel structure 91 rolls on wheels, such as wheels 104, 105, 106, 107 mounted on housing 60 or slide on sliding means vertically. The distance to roll in and succeed deformation of the piezoelectric stacks is less than one millimeter. Housing 60 is fixed in its position and made of rigid material, such as steel. Compressing surface 100, transfers the pressure applied by cylinder 50 to the piezoelectric stacks. Raised areas on compressing surface 100, such as area 110, optionally includes springs (not shown), in order to compress the corresponding stack. Alternatively, they may be covered by a thin layer of elastomeric material. Steel structure 91 is supported in place by the lower part of housing 60 and more specifically side holders 112 and 113. Special grooves, not shown, exist inside housing 60 for the electrodes and wiring of the piezoelectric stacks. Anti-humidity means may be used to secure openings, such as cable holes. The particular cylindrical surface 98 and the steel rods connected to it serve the purpose of receiving and transferring the compression exercised by cylinder 50. Other "pushing mechanisms" may be used, to succeed the task.

The piezoelectric stacks can bear loads of up to several tons which causes them to deform, as mentioned above. This deformation is due to solid-state effects and does not involve wear and tear. The piezoelectric stacks will produce a voltage or current proportional to the applied force. Electrical current is generated when the piezoelectric stacks are electrically connected to an external electric circuit and are mechanically stressed periodically. The piezoelectric layers of each stack can be connected together in parallel or in series, depending on the application. If they are connected in series, then a large voltage will be produced. If connected in parallel, each layer can be considered as a current contributor.

The piezoelectric stacks, 120 through 125, shown in FIG. 4c, experience a varying force, as cylinder 50 compresses upwards. Similarly, the piezoelectric stacks in housing 80, of FIG. 4b, experience a similar compression downwards. When the up and down movement of the cylinder is repeated periodically, reciprocating the ocean waves' motion, each one of these piezoelectric stacks produces a periodically varying voltage waveform. Each piezoelectric stack in each housing, is compressed at the same time, thus producing the same voltage waveform. The more the stacks the larger the voltage produced. When the values of the up and down forces exercised on the stacks are equal, the waveforms produced by the upper stacks are similar to the waveforms produced by the lower stacks. The only difference is that when the ones produce electricity the others do not produce. However, if the upper and lower waveforms are added together, the resulting waveform approximates a sinusoidal wave, as shown in FIG. 4d. If the waveforms produced by the upper and lower stacks are not the same, they can be further processed by additional circuitry (not shown) to produce a more homogeneous output. The waveform shown in FIG. 4d can be converted into a DC signal by many well known circuit techniques.

The advantages of this embodiment include simplicity and very few moving elements to produce electricity. It is easily accessible for maintenance and maintenance cost is minimal.

The invention claimed is:

1. A device that transforms ocean wave energy to different forms of energy comprising:
   a. a rigid beam having a first end and a second end;
   b. an elastic beam having a first end and a second end;
   c. a connecting means connecting firmly said rigid beam second end to said elastic beam first end;
   d. a pivot that is pivotally attached to said rigid beam at a pivot point between said first and second ends of said rigid beam;
   e. a platform that is secured at a fixed position relative to the ocean waves, supporting said pivot;
   f. a float that is attached to said rigid beam first end, said float is in direct communication with the ocean waves transferring reciprocating motion to said beams thus forcing said elastic beam second end to travel on an arc-shaped pivoting path;
   g. at least one latch means secured in position on the said arc-shaped pivoting path of said elastic beam second end, for: a. obstructing said elastic beam second end's motion for a fraction of a half ocean wave's period, when said elastic beam second end is pivoting in the direction towards the mid-point of said arc-shaped path, thus forcing said elastic beam to deflect and accumulate potential energy initially and then escape obstruction, due to deflection forces, releasing the potential energy and continue pivoting and b. allowing said elastic beam second end to pass freely when pivoting in the opposite direction, whereby said elastic beam, due to said obstruction, develops kinetic energy with increased pivoting speed and momentum and can drive an electromagnetic generator;
   h. said elastic beam is of material with sufficient elasticity and strength to successfully resist failure due to the action of said one latch means.

2. The device of claim 1 further including:
   a. a lever arm having a proximate end and a distant end;
   b. coupling means, coupling said lever arm proximate end to said elastic beam second end transferring said elastic beam second end's reciprocating motion to said lever arm;
   c. a distant pivot that is pivotally attached to said lever arm distant end, said distant pivot is secured at a fixed position on said platform;
   d. an electric generator comprising a stator and a rotor driven by a driveshaft; said electric generator is secured at a fixed position relative to said platform; said electric generator's rotational axis is perpendicular to the plane defined by the pivoting motion of said lever arm;
   e. a freewheel gear, mounted on said driveshaft, able to receive power transmission only in one direction and to allow said driveshaft to continue turning when said driveshaft's angular velocity is greater than said freewheel gear's angular velocity;
   said freewheel gear has a freewheel body with teeth at an angle showing the opposite to a power transmission direction, a bearing and a rotational ratchet and pawl;
   f. a reciprocating ratchet and pawl mechanism, comprising a concave ratchet rack with teeth at an angle showing the direction of power transmission and a convex ratchet rack with teeth at an angle, also showing the direction of power transmission, firmly mounted on said lever arm between said lever arm ends, having said concave and convex rack teeth engaged to said freewheel gear teeth on each side of said freewheel gear, said concave and convex ratchet racks transfer to said freewheel gear the reciprocating motion of said lever arm and provide power transmission in one direction but move freely in the opposite direction, whereby said freewheel gear and rotor rotate always in the same angular direction utilizing ocean wave energy to generate electricity.

3. The device of claim 1 further including:
   a. a lever arm having a proximate end and a distant end;
   b. coupling means, coupling said lever arm proximate end to said elastic beam second end transferring said elastic beam second end's reciprocating motion to said lever arm;
   c. a distant pivot that is pivotally attached to said lever arm distant end, said distant pivot is secured at a fixed position on said platform;
   d. an electric generator comprising an inner rotor having at least one magnet driven by an inner driveshaft, a counter-rotating outer rotor having at least one coil, surrounding the inner rotor and being driven by an outer driveshaft; said outer driveshaft surrounds said inner driveshaft; said inner driveshaft is longer and extents further from said outer driveshaft; said electric generator is secured at a fixed position relative to said platform; said electric generator's rotational axis is perpendicular to the plane defined by the pivoting motion of said lever arm;
   e. an inner freewheel gear, mounted on said inner driveshaft, able to receive power transmission only in one direction and to allow said inner driveshaft to continue turning when said inner driveshaft's angular velocity is greater than said inner freewheel gear's angular velocity; said inner freewheel gear has a freewheel body with teeth at an angle showing the opposite to a power transmission direction, a bearing and a rotational ratchet and pawl; said inner freewheel gear is mounted on said inner driveshaft at a point where said inner driveshaft extends further from said outer driveshaft;
   f. an outer freewheel gear, mounted on said outer driveshaft, able to receive power transmission only in one direction and to allow said outer driveshaft to continue turning when said outer driveshaft's angular velocity is greater than said outer freewheel gear's angular velocity; said outer freewheel gear has a freewheel body with teeth at an angle showing the opposite to a power transmission direction, a bearing and a rotational ratchet and pawl; said outer freewheel gear is mounted on said outer driveshaft to rotate in the opposite direction to said inner freewheel gear;
   g. a reciprocating inner ratchet and pawl mechanism, comprising an inner concave ratchet rack with teeth at an angle showing the direction of power transmission and an inner convex ratchet rack with teeth at an angle, also showing the direction of power transmission, firmly mounted on said lever arm between said lever arm ends, having said inner concave and convex rack teeth engaged to said inner freewheel gear teeth on each side of said inner freewheel gear; said inner concave and convex ratchet racks transfer to said inner freewheel gear the reciprocating motion of said lever arm and provide power transmission in one direction and move freely in the opposite direction, whereby said inner freewheel gear and said inner rotor receive rotational power from ocean waves causing said inner rotor to rotate always in the same angular direction;

h. a reciprocating outer ratchet and pawl mechanism, comprising an outer concave ratchet rack with teeth at an angle showing the direction of power transmission and an outer convex ratchet rack with teeth at an angle, also showing the direction of power transmission, firmly mounted on said lever arm between said lever arm ends, having said outer concave and convex rack teeth engaged to said outer freewheel gear teeth on each side of said outer freewheel gear; said outer concave and convex ratchet racks transfer to said outer freewheel gear the reciprocating motion of said lever arm and provide power transmission in one direction and move freely in the opposite direction, whereby said outer freewheel gear and said outer rotor receive rotational power from ocean waves causing said outer rotor to rotate always in the same angular direction and counter-rotating to said inner rotor, generating electricity.

4. A method of transforming a reciprocating motion of a mass into electrical power comprising the steps of:
   a. providing an assembly including inner and outer coaxial shafts, each having fixed at one end a freewheel gear, said freewheel gears rotating in opposite directions, clockwise and counterclockwise;
   b. providing a lever arm having one end attached to a pivot, said pivot is placed so as to be in proximity and in fixed position relative to said assembly;
   c. mounting a first concave ratchet and pawl mechanism on said lever arm so as to: a. have first concave ratchet teeth engaged to a first side of said clockwise rotating freewheel gear and b. rotate clockwise said clockwise rotating freewheel gear, when said lever arm pivots in a first direction;
   d. mounting a first convex ratchet and pawl mechanism on said lever arm so as to: have first convex ratchet teeth engaged to the opposite of said first side of said clockwise rotating freewheel gear and b. rotate clockwise said clockwise rotating freewheel gear, when said lever arm pivots in the opposite to said first direction;
   e. mounting a second concave ratchet and pawl mechanism on said lever arm so as to: a. have second concave ratchet teeth engaged to a first side of said counterclockwise rotating freewheel gear and b. rotate counterclockwise said counterclockwise rotating freewheel gear, when said lever arm pivots in the opposite to said first direction;
   f. mounting a second convex ratchet and pawl mechanism on said lever arm so as to: a. have second convex ratchet teeth engaged to the opposite of said first side of said counterclockwise rotating freewheel gear and b. rotate counterclockwise said counterclockwise rotating freewheel gear, when said lever arm pivots in said first direction;
   g. providing an armature winding on the outer shaft;
   h. providing a plurality of magnets on the inner shaft;
   i. providing coupling means for coupling the opposite to said pivot end of said lever arm with said mass so that said reciprocating motion of said mass is transferred to said lever arm,
      whereby said lever arm pivots in reciprocating motion, forcing said inner shaft with said magnets and said outer shaft with said armature winding to counter-rotate, generating electrical power.

5. A device that transforms ocean wave energy to different forms of energy comprising:
   a. a rigid beam having a first end and a second end;
   b. an elastic beam having a first end and a second end;
   c. a connecting means connecting firmly said rigid beam second end to said elastic beam first end;
   d. a pivot that is pivotally attached to said rigid beam at a pivot point between said first and second ends of said rigid beam;
   e. a platform that is secured at a fixed position relative to the ocean waves, supporting said pivot;
   f. a float that is attached to said rigid beam first end, said float is in direct communication with the ocean waves transferring reciprocating motion to said beams thus forcing said elastic beam second end to move on a travelling path;
   g. at least one stop means secured at a fixed position relative to said platform, said at least one stop means is positioned in said traveling path of said elastic beam second end for preventing the motion of said elastic beam second end, forcing said elastic beam to deflect, whereby said elastic beam is capable of compressing electroactive material to generate electrical energy;
   h. said elastic beam is made of material with sufficient elasticity to successfully resist failure due to the action of said at least one stop means.

6. The device of claim 5, wherein said at least one stop means comprises two stop means, stopping said elastic beam's reciprocating movement.

7. The device of claim 6, wherein said two stop means are made of piezoelectric material,
   whereby said piezoelectric material being compressed periodically generate electrical power.

* * * * *